United States Patent [19]

Herolf

[11] Patent Number: 5,308,216
[45] Date of Patent: May 3, 1994

[54] FORWARDER

[75] Inventor: Olof Herolf, Sundsvall, Sweden

[73] Assignee: Osa AB, Alfta, Sweden

[21] Appl. No.: 342,958

[22] Filed: Apr. 24, 1989

Related U.S. Application Data

[63] Continuation-in-part of Ser. No. 104,060, Aug. 25, 1987, abandoned.

[30] Foreign Application Priority Data

Jan. 10, 1987 [SE] Sweden .................. 8600123

[51] Int. Cl.$^5$ .................. B60P 1/54
[52] U.S. Cl. .................. 414/550; 180/135; 180/209; 212/180
[58] Field of Search .............. 414/550, 555, 546, 547, 414/495; 212/180, 181; 180/135, 209, 22, 23, 24, 41, 326, 327

[56] References Cited

U.S. PATENT DOCUMENTS

| | | | |
|---|---|---|---|
| 3,299,978 | 1/1967 | Sponsler | 180/22 X |
| 3,356,239 | 12/1967 | Klein | 414/495 X |
| 3,414,072 | 12/1968 | Hodges, Jr. et al. | 180/135 X |
| 3,601,169 | 8/1971 | Hamilton et al. | 414/550 X |
| 3,831,693 | 8/1974 | King | 180/23 X |
| 4,350,190 | 9/1982 | McColl | 180/24 X |
| 4,470,475 | 9/1984 | Carlson | 180/22 X |

FOREIGN PATENT DOCUMENTS

| | | |
|---|---|---|
| 400243 | 3/1978 | Sweden . |
| 402554 | 7/1978 | Sweden .................. 414/550 |
| 86-02893 | 5/1986 | World Int. Prop. O. . |

*Primary Examiner*—David A. Bucci
*Attorney, Agent, or Firm*—McFadden, Fincham, Marcus & Allen

[57] ABSTRACT

A forwarder has an elongate rigid chassis with a cab at a forward end, a load carrier on the chassis, and a crane serving the load carrier. Four wheels at the front are mounted as a pair on each side, each pair on a common yoke to form a bogie. The bogies can pivot relative to the chassis for up and down movement of the wheels, but the wheels are non-steerable. A single wheel at each side at the rear of chassis is steerable, to provide steering of the forwarder. The cab, the operator, the load lifting device and the load carrier always have the same, fixed, orientation at all times.

17 Claims, 3 Drawing Sheets

FORWARDER

This application is a continuation-in-part of application Ser. No. 104,060, filed Aug. 25, 1987, now abandoned.

TECHNICAL FIELD OF THE INVENTION

This invention relates to a forwarder comprising a rigid, longitudinal wheeled chassis, a driver's cab, a load carrier served by a crane, and six hydrostatically, individually driven wheels, of which four front wheels are located in the region underneath the cab, a pair on each side, in such a manner that the pairs of wheels are each mounted on a common yoke to form a bogie, the bogies individually pivotal relative to the chassis. The rear wheels are steerably mounted on the chassis.

Typical of the prior art are U.S. Pat. No. 4,470,475 of September, 1984 to Carlson; Carlson discloses a multi-wheeled vehicle having for sets of wheels on an articulated chassis. U.S. Pat. No. 4,350,190 of September 1982 to McColl; McColl discloses a complex arrangement in which separate means for the wheels are employed (e.g. FIG. 3) and in which each set of four wheels is provided with its own bogie arrangement. U.S. Pat. No. 3,831,693 of August 1974 to King; King discloses a grader arrangement in which a pair of front wheels are mounted by a separate frame structure to a motorized rear portion and in which each of the rear sets of wheels are driven by a special arrangement. U.S. Pat. No. 3,601,169 of September 1968 to Hamilton et al.; Hamilton discloses a tree handling vehicle in which there are separate chassis interconnecting which are mounted for articulated movement and in which a four wheel drive is disclosed for movement of the tree felling device (column 3, lines 4 et seq.). U.S. Pat. No. 3,414,072 of December 1968 to Hodges, Jr. et al.; Hodges discloses an articulated vehicle having opposed pairs of steerable front wheels for a vehicle in which special requirements exist for roll, pitch and yaw axes. U.S. Pat. No. 3,299,978 of January 1967 to Sponsler; Sponsler discloses a vehicle having four adjacent wheels mounted on each side of the vehicle body for specialized terrain movement, with each pair of wheels being driven on an associated beam.

SUMMARY OF THE INVENTION

The present invention aims at providing a lightweight, compact forwarder which is easy and inexpensive to manufacture and which affords high reliability and convenience for the driver, and the crane of which can be readily and conveniently operated.

According to one aspect of the invention, this and other objects are achieved in that a bottom chassis part for the load carrier is rigidly connected to a front part of the chassis carrying the crane and/or the cab, and that two single rear wheels located underneath the load carrier on each side of the chassis are steerable by a pivotal movement relative to the chassis and mounted thereon by means of a pendulum suspension.

According to another aspect of the present invention there is provided a forwarder having a wheeled chassis, a driver's cab, a load carrier and load lifting device for serving the load carrier, comprising a longitudinally extending rigid chassis, the driver's cab mounted on and above the front end of the chassis; a pair of non-steerable wheels mounted on each side of the chassis beneath the driver's cab, each pair of wheels mounted on a common yoke to form a bogie which is individually pivotal about a horizontal axis relative to the chassis; the load carrier mounted on the chassis; two further wheels attached to the chassis, at the rear end, a wheel on each side of the chassis and mounted by a pendulum suspension, each further wheel steerable by a pivotal movement relative to the chassis, the load lifting device mounted on the front end of the chassis above the driver's cab, the load lifting device, the driver's cab and the load carrier having a fixed orientation at all times.

According to yet another aspect of the present invention there is provided a forwarder comprising a single longitudinally extending rigid wheeled chassis having front and rear ends; a driver's cab mounted above the front end of the chassis; a load carrier associated with the chassis behind the driver's cab; and a load lifting device mounted above the driver's cab for loading a load onto the load carrier; a lateral pair of wheels mounted on each side of the front end of the chassis, each lateral pair of the wheels mounted on a common yoke to form a bogie; the bogie being pivotably mounted relative to the chassis whereby the bogie is pivotable about a horizontal axis relative to the chassis; an opposed pair of rear wheels mounted at the rear of the chassis; pendulum suspension means for mounting the rear wheels to permit the rear wheels to pivot relative to the chassis in a direction transversely extending to the axial direction of the chassis, steering means for steering the rear wheels; the steering means being capable of effecting a pivotable movement of the rear wheels relative to the chassis.

BRIEF DESCRIPTION OF THE DRAWINGS

Having briefly described the invention above, reference will now be made to the accompanying drawings, in which.

DESCRIPTION OF THE PREFERRED EMBODIMENTS

Figure 1:
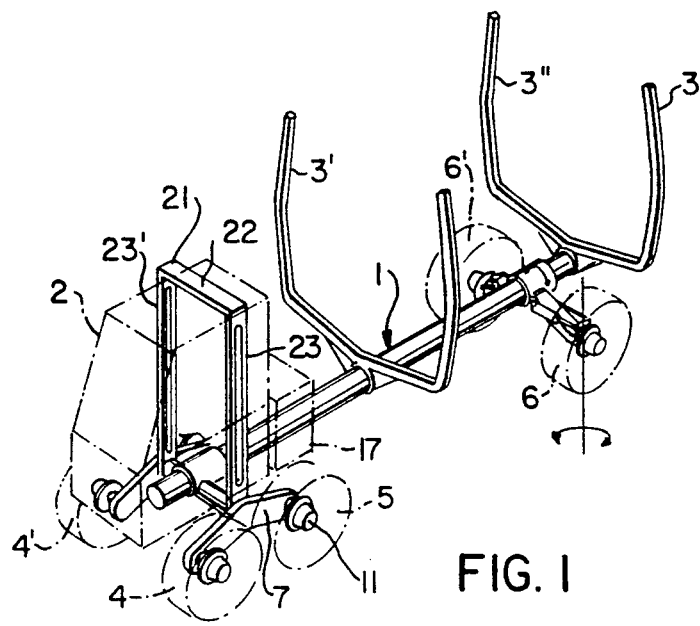
FIG. 1 is a simplified perspective view illustrating a first embodiment of the forwarder in accordance of the invention.
Figure 2:
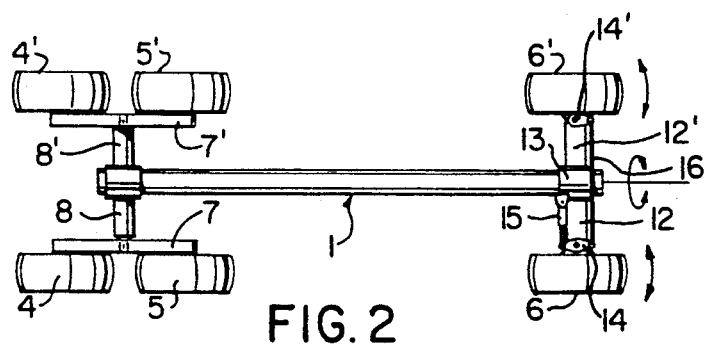
FIG. 2 is a top plan view of the chassis of the forwarder in FIG. 1.

The forwarder illustrated in FIGS. 1-4 has a rigid chassis 1 on one end of which is mounted a drivers cab 2. Behind the cab is mounted a load carrier 3, in the embodiment comprising two spaced loading bunks 3' and 3''. Conveniently the rigid chassis comprises a sturdy, simple tubular structure, mounted on six wheels, there being four front wheels 4, 4' and 5, 5' and two rear wheels 6, 6'. The two front wheels 4 and 5 located on the one side of the vehicle are mounted on a common yoke 7, forming a bogie which is individually pivotable relative to the chassis, more specifically relative to a transverse suspension arm 8 rigidly connected to the chassis 1.

Similarly the two front wheels 4' and 5' located on the other side of the vehicle are mounted on a common yoke 7', forming a bogie individually pivotable relative to the chassis, and more specifically relative to a transverse arm 8' rigidly connected to the chassis 1.

The pivotal movement of each yoke about its pivot point 9 (FIG. 3) can be brought about by means of at least one hydraulic cylinder 10, for each yoke. In a particular embodiment, there is a hydraulic motor 11 in each of the six wheels, by which the wheels can be individually driven.

The rear wheels 6, 6' are mounted on arms 12, 12' respectively. The arms are connected to the chassis, on either side thereof, by pendulum suspensions 13 which allow the arms 12, 12', and thus the wheels 6, 6', to pivot or execute a pendulum movement relative to the chassis. The rear wheels are designed with a so-called double-pivot steering. This means that they are pivotal relative to vertical pivots 14, 14', at the outer, free, ends of the arms 12, 12'. The pivotal movement of the wheels is obtained by a hydraulic cylinder 15 in combination with a track rod 16, ensuring that the wheels are always pivoted in a uniform manner. In accordance with a particular feature, the rear wheels 6, 6' can idle, when so desired, by the disengagement of the associated hydraulic motors.

Figure 3:
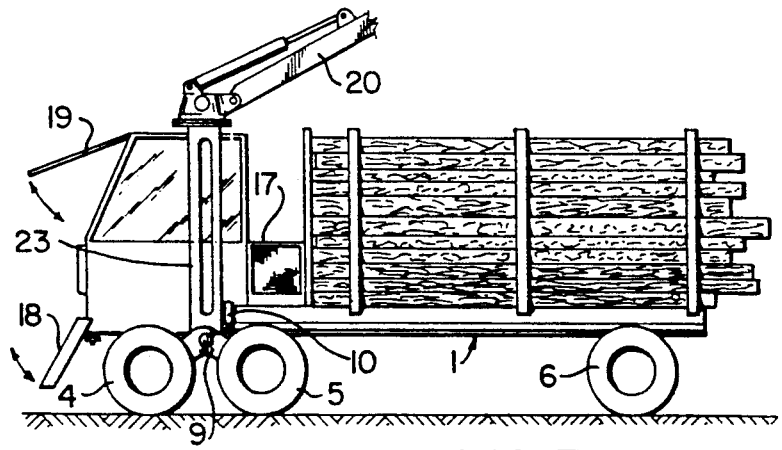
FIG. 3 is a side view of the chassis of the forwarder in FIGS. 1 and 2.
Figure 4:
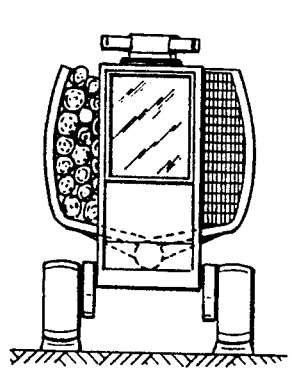
FIG. 4 is a front end view of the embodiment illustrated in FIGS. 1, 2 and 3.

Behind the driver's cab 2, there is provided a drive unit 17 which may contain a fuel tank, an engine, a hydraulic motor, a hydraulic tank and hydraulic valves. Alternatively, this drive unit may be mounted for instance underneath the cab so as to obtain an extremely compact forwarder. As best seen in FIG. 3, the operator can enter the cab 2 by the front, suitably in that a lower wall-forming part 18 can be folded down and is provided with steps on its inside, while an upper, transparent door 19 can be swung upwards.

The crane 20 which is intended to serve the load carrier 3 is mounted with its base portion above the roof of the driver's cab 2. More specifically, the crane is mounted on a frame 21 comprising a cross-beam 22 and two vertical legs 23, 23' on both sides of the cab. The legs 23, 23' are disposed approximately midway between the two front wheels 4, 5 of each bogie so as to provide sufficient stability in connection with loading and unloading.

There is thus provided a vehicle with a longitudinally extending rigid chassis having two pairs of wheels at the front which can move up and down, for levelling and other purposes, but which are nonsteerable. Steering is obtained by the rear wheels, a single wheel on each side, and pivotal in unison about vertical axes. Such an arrangement is extremely simple and efficient. If more than a single wheel is provided at each side at the rear, for example a pair of wheels, then each wheel of a pair would have a different radius of movement relative to the axis around which the vehicle is turned. This results in scuffing of the wheels and also waste of power. The non-steerable front wheels enable a relatively simple mounting.

The resultant vehicle with rigid chassis with non-steerable but tiltable front wheels and steerable rear wheels provides for the situation in which the crane, the operator or driver, and the load always occupy the same geometrical fixed position or orientation in relation to the load carrier.

Previous vehicles have articulated chassis, which do not provide the above mentioned orientation at all times. Often multiple wheels at the front are all steerable, as well as pivotal, requiring a more complex mounting. Some vehicles obtain steering by moving one part of an articulated chassis relative to another. This affects load orientation.

Figure 6:
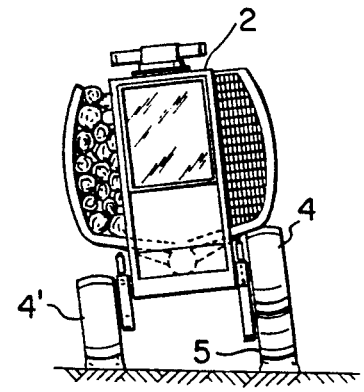
FIG. 6 is an end view illustrating the forwarder in another state operation.
Figure 5:
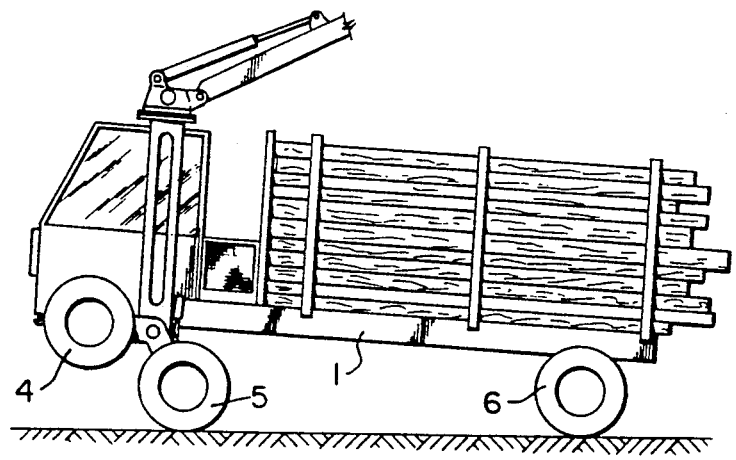
FIG. 5 is side view illustrating the forwarder in a particular state of operation.

During cross-country driving, all six wheels are advantageously driven, so that the vehicle will run safely and with great power, although at a relatively low speed (e.g. 0–10 km/h). When, on the other hand, the vehicle travels on a road at a higher speed, the rear wheels are disconnected so as to become idle, and the front wheel bogies are tilted in the manner illustrated in FIG. 5, whereby only two wheels, namely the wheels 5, 5' will rotate and be in driving engagement with the ground. In this manner, it is possible to increase the speed three times (e.g. up to 20–30 km/h). It is also conceivable to run the forwarder with all four wheels in driving engagement with the ground, so as to obtain an intermediate speed (e.g. 10–20 km/h). The tilting of the front wheel bogies in the manner shown in FIG. 5 may also be effected during crosscountry travel, for instance on a snowy ground, in which case the front wheels will compact the snow so as to facilitate the travel of the following wheels. Such tilting of the front wheel bogies may also be used for increasing the stability of the vehicle. Individual tilting of the wheel bogies may be effected when driving on sloping ground, as illustrated in FIG. 6. By such tilting, the cab can be maintained in a substantially horizontal position despite the slope of the ground.

Figure 7:
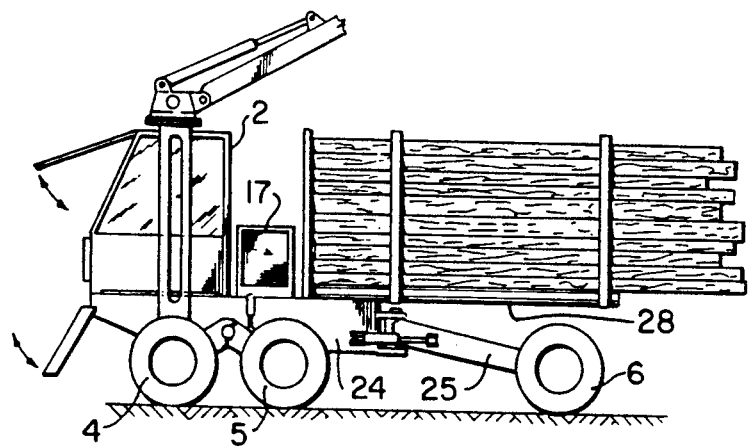
FIG. 7 is a side view of an alternative embodiment of the forwarder.
Figure 8:
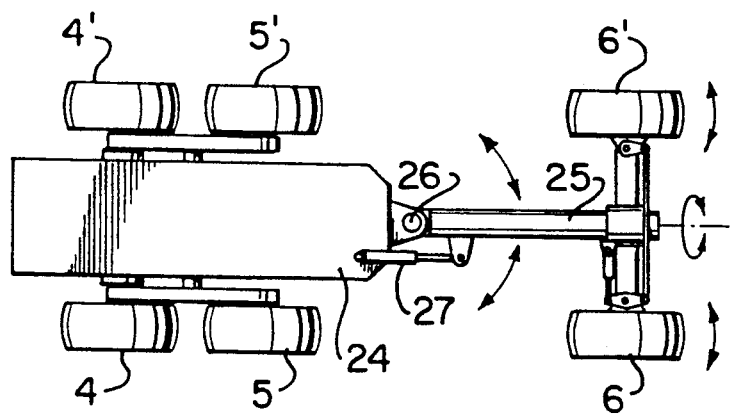
FIG. 8 is top plan view of the chassis of the forwarder shown in FIG. 7.

Reference is now made to FIGS. 7 and 8 illustrating an alternative embodiment. In this embodiment the chassis comprises a front part 24, carrying the cab 2 and crane and also the wheels 4, 5 and 4', 5', and a longitudinally extending load carrying part 28. The parts 24 and 28 form a longitudinally extending rigid chassis. Attached to the rear end of the front part 24 is a tail part 25. Attachment is by a pivotal joint 26, pivoting of the tail part 25 about the joint 26 being provided by the hydraulic cylinder 27. Two rear wheels 6 and 6' are mounted at the rear of the tail part. The mounting of the wheels 6 and 6' is in the same manner as in the embodiment illustrated in FIGS. 1 to 4.

This arrangement still has the non-steerable front wheels, steerable rear wheels and rigid chassis providing the constant orientation between crane, operator and load, and load carrier but can also provide as an extra feature, the advantage of articulated frame steering, when required, without loss of such orientation.

Although drive unit 17 is shown between the cab 2 and the load carrier 3, it is conceivable to build in the drive unit in the cab-supporting part 24 so as to reduce the overall length of the vehicle.

Figure 9:
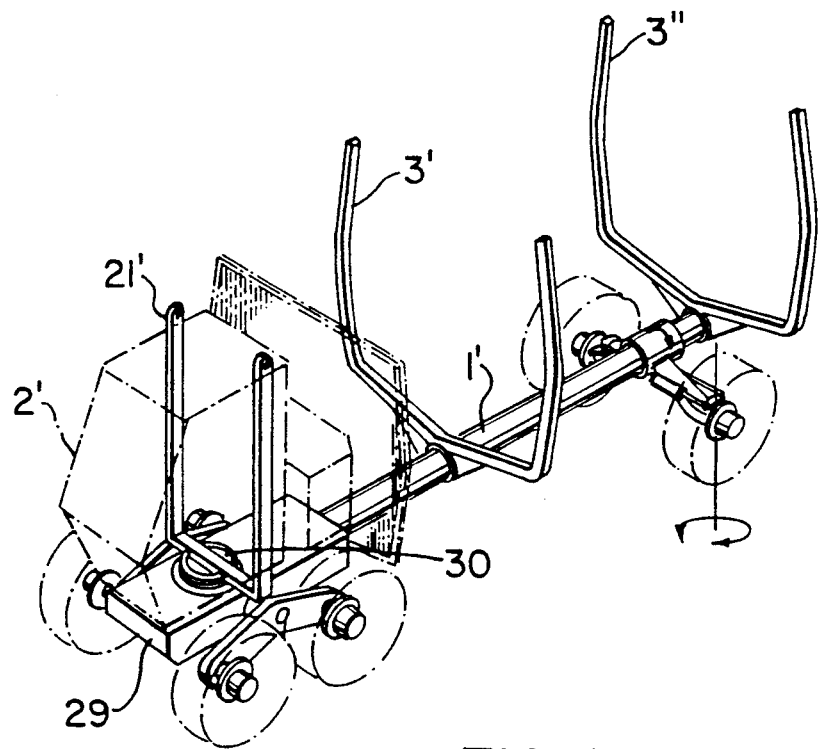
FIG. 9 is a perspective view of yet another alternative embodiment of the invention.

In the embodiment shown in FIG. 9, the tubular structure 1' is rigidly connected to a front box or part 29 supporting the cab 2', the tubular structure 1' and the front part 29 together forming a continuous rigid chassis. In this case, the crane or the frame 21' serving as attachment for the crane is stationarily connected to the cab 2' which is connected to the chassis, more precisely the front part 29 thereof, by the intermediary of a gear rim 30 or the like allowing the cab to rotate relative to the chassis. In this way, the crane will positively follow the cab during rotation thereof to different working positions. This in turn means that the operator sitting in the cab need not turn his body to follow the crane when moved to different working positions. In this context, it should also be noted that the central point about which both the cab and the crane pivot is always fixed in relation to the load carrier since the tubular structure 1' is rigidly connected to the front part 29.

As previously stated, a particular or unique feature of the invention is a single rigid chassis (in the form of a single tubular structure 1 according to FIGS. 1-6; the front part 24 and the load carrying part 28 rigidly connected thereto according to FIGS. 7-8; and the front part 29 and the tubular structure 1' according to FIG. 9) carries both the load carrier and the cab as well as the crane mounted on the cab. In this manner, the attachment or pivot point of the crane will always occupy one and the same geometrically fixed position in relation to the load carrier, this considerably facilitating loading and unloading of the load carrier as compared with such forwarders with articulated frame steering in which the load carrier is articulated in relation to the cab chassis and in which, as is well known, the load carrier may occupy highly different positions in relation to the crane. It should also be pointed out that the chassis of the forwarder does not require any special spring systems since the required spring action of the vehicle is fully satisfied by the resilience of the tires of the wheels. Thus, the chassis can be manufactured in an extremely simple and inexpensive way.

POSSIBLE MODIFICATIONS OF THE INVENTION

Naturally, the invention is not restricted only to the embodiments described above and shown in the drawings. Thus, the design of the driver's cab, the crane, the crane attachment, the load carrier and the chassis may be modified in several different ways within the spirit and scope of the accompanying claims.

I claim:

1. A forwarder having a wheeled chassis, a driver's cab, a load carrier and a load lifting device for serving the load carrier, comprising:
    a longitudinally extending rigid chassis having a longitudinal axis, said driver's cab mounted on and above the front end of the chassis on said axis; a pair of non-steerable wheels mounted on each side of said chassis beneath said driver's cab, each pair of wheels mounted on a common yoke to form a bogie which is individually pivotal about a horizontal axis relative to said chassis; said load carrier mounted on said chassis and symmetrical with said axis; a single pair of wheels attached to said chassis, at the rear end, a wheel on each side of said chassis and mounted by a pendulum suspension, each wheel of said single pair of wheels being steerable by a pivotal movement relative to said chassis, said load lifting device mounted on the front end of the chassis above the driver's cab along said axis, the load lifting device, the drivers cab and the load carrier having a fixed geometrical orientation along said axis at all times.

2. A forwarder as claimed in claim 1, including individual driving means for each wheel.

3. A forwarder as claimed in claim 2, including means for alternatively maintaining both wheels of each of said pair of non-steerable wheels, and only one wheel of each of said single pair of wheels, in driving engagement with the ground.

4. A forwarder as claimed in claim 1, said wheels attached to said chassis at the rear end being mounted on the chassis, and each pivotal about an axis spaced from said chassis.

5. A forwarder as claimed in claim 1, including a frame having spaced legs, said legs extending on each side of said driver's cab, and said load lifting device comprising a crane mounted on said frame over said driver's cab.

6. A forwarder as claimed in claim 1, characterized in that each said wheel attached to said chassis at the rearend is articulated to an arm extending outwardly from said chassis and pivotal in relation to said arm, for steering said single pair of wheels.

7. A forwarder as claimed in claim 1, characterized by a tail part attached to a rear end of said chassis and articulated thereto, said single pair of wheels mounted on said tail part and pivotal in relation to the chassis by at least one hydraulic cylinder for steering said single pair of wheels at a desired angle relative to the front wheels.

8. A forwarder as claimed in claim 1 characterized in that the load lifting device is rigidly connected to the drivers cab, and means rotatably mounting the drivers cab on the chassis on said longitudinal axis.

9. A forwarder comprising:
    a single longitudinally extending rigid wheeled chassis having front and rear ends and a longitudinal axis,
    a driver's cab mounted above said front end of said chassis,
    a load carrier associated with said chassis behind said drier's cab, and
    a load lifting device mounted above said driver's cab for loading a load onto said load carrier;
    said driver's cab, said load carrier and said load lifting device being along said longitudinal axis;
    a lateral pair of wheels mounted on each side of said front end of said chassis, each lateral pair of wheels mounted on a common yoke to form a bogie,
    said bogie being pivotably mounted relative to said chassis whereby said bogie is pivotable about a horizontal axis relative to said chassis;
    a single pair of rear wheels mounted on said rear of said chassis,
    pendulum suspension means for mounting said rear wheels to permit said rear wheels to pivot relative to said chassis in a direction transversely extending to the axial direction of said chassis,
    steering means for steering said rear wheels,
    said steering means being capable of effecting a pivotable movement of said rear wheels relative to said chassis.

10. A forwarder as claimed in claim 9, wherein said single pair of rear wheels are mounted on said chassis, said rear wheels being pivoted about a mounted axis spaced from said chassis.

11. A forwarder as claimed in claim 9, including a frame having spaced legs, said legs extending on each side of said driver's cab, and said load lifting device comprises a crane mounted on said frame above said driver's cab.

12. A forwarder as claimed in claim 9, including a tail articulated to rear end of said chassis, said single pair of rear wheels mounted on said tail, said tail pivotal in relation to said chassis by at least one hydraulic cylinder for steering said rear wheels at a desired angle relative to said front wheels.

13. A forwarder as claimed in claim 9, including means for maintaining all four of said front wheels or only two of said front wheels in driving engagement with the ground.

14. A forwarder as claimed in claim 9, wherein each said rear wheel is articulated to an arm projecting from said pendulum suspension means and pivotal in relation to said arm by means of a hydraulic cylinder for steering said rear wheels at a desired angle relative to said front wheels.

15. A forwarder as claimed in claim 9, wherein said chassis is in the form of a structure having bending and torsional rigidity and extending between fixed suspension means for said front wheel bogies and said pendulum suspension means for said rear wheels, both said load carrier and said load lifting means being mounted on said structure.

16. A forwarder as claimed in claim 10, wherein said load lifting means is rigidly connected to said driver's cab and said driver's cab is rotatable on said longitudinal axis relative to said chassis.

17. A forwarder having an elongate rigid chassis;

a pair of non-steerable front wheels mounted on each side of said chassis at a forward end thereof, each pair of wheels mounted on a common yolk to form a bogie pivotal about a horizontal axis;

a single pair of rear wheels mounted at a rear end of the chassis, said single pair of wheels mounted by a pendulum suspension and steerable relative to said chassis;

a cab mounted on said forward end of said chassis over said front wheels, said cab being along a said longitudinal axis;

a load carrier, mounted on said chassis behind said cab, said load carrier extending along said longitudinal axis;

a load lifting device mounted on said chassis above said cab and rotatable about a vertical axis extending from said longitudinal axis;

said cab, said load carrier and said load lifting device having a fixed orientation along said longitudinal axis at all times.

* * * * *